United States Patent [19]

Tsuji et al.

[11] 4,357,164

[45] Nov. 2, 1982

[54] INK COMPOSITION FOR WATERLESS LITHOGRAPHY AND METHODS OF PRINTING THEREFROM

[75] Inventors: Kunio Tsuji, Yono; Toshiaki Tsuji, Urawa; Otugu Hayashi, Saitama; Tsutomu Hayashi, Tokyo, all of Japan

[73] Assignee: Sakata Shokai, Ltd., Osaka, Japan

[21] Appl. No.: 212,224

[22] Filed: Dec. 2, 1980

[30] Foreign Application Priority Data

Dec. 11, 1979 [JP] Japan .................................. 54/161357
Nov. 21, 1980 [JP] Japan .................................. 55/164947

[51] Int. Cl.$^3$ ...................... C09D 11/08; C09D 11/10
[52] U.S. Cl. .......................................... 106/29; 106/27; 106/30; 106/32
[58] Field of Search ....................... 106/27, 29, 30, 32; 260/38

[56] References Cited

U.S. PATENT DOCUMENTS 4,255,196  3/1981  Emmons et al. ...................... 106/29

*Primary Examiner*—Allan Lieberman
*Assistant Examiner*—Pat Short
*Attorney, Agent, or Firm*—Wenderoth, Lind & Ponack

[57] ABSTRACT

An ink composition for waterless lithography having good printing properties which makes it possible to print from a lithographic printing plate with one fluid without using any kind of water fountain system to mask a non-image area, said ink composition containing high-boiling petroleum solvent mixtures which have a boiling point higher than 200° C. and which contain less than 5% by volume of aromatic components, and in addition to the above containing an aliphatic acid ester, an aliphatic dibasic acid ester and/or a phosphoric acid ester.

13 Claims, No Drawings

4,357,164

INK COMPOSITION FOR WATERLESS LITHOGRAPHY AND METHODS OF PRINTING THEREFROM

FIELD OF THE INVENTION

This invention relates to an ink composition for waterless lithography having good printing properties, which makes it possible to print from a lithographic printing plate with one fluid without using any kind of water fountain system to mask a non-image area and also to methods of printing therefrom.

DESCRIPTION OF PRIOR ART

In lithographic printing that uses the properties of oily ink and water to repel each other, a printing plate comprising lipophilic image areas and hydrophilic (water receptive) non-image areas is provided with a fountain solution and an oily ink (two fluid printing), whereupon the oily ink adheres only to the image areas and is transferred to a printing material. But the feeding control of the fountain solution and the oily ink is very difficult and requires much skill and improper control results in various problems such as scumming and greasing, due to emulsification, poor halftone reproduction, low gloss and piling phenomena buildup due to the low water resistance of paper.

To solve these problems of the conventional lithographic printing technique using a fountain solution and to provide printed matter of good quality by an efficient printing operation, many studies have been made on the technique of waterless lithography and some of them are being used on a commercial scale. In waterless lithography, a silicone-based low adhesion layer having small surface energy is formed on non-image areas, whereas a lipophilic layer is formed on image areas, to prevent the adhesion of oily ink to the non-image areas (see U.S. Pat. No. 3,511,178).

The conventional designs of printing ink for waterless lithography aim at preventing the adhesion of ink to non-image areas either by increasing the tackiness of the ink (hence increasing the cohesive force between the ink particles), or by adding organopolysiloxane or the like to the ink (see Japanese Patent Publication No. 11287/75) or using a silicone modified resin as an ink vehicle (see Japanese Patent Publication Nos. 10124/76, 22405/76, 10041/77, 10042/77 etc.). The former type of ink is not effectively transferred from the roller or blanket to a printing material. In addition, the leveling of the ink on a printing material is poor and provides a low gloss. In addition to these defects, the latter type of ink forms an ink film of low surface energy on a printing material, so ink trapping on a previously printed ink layer is not sufficient in multicolor printing.

Another defect of the ink of the former type is that, although a so-called scumming or greasing does not form much in the non-image areas (i.e. background) when the temperature of the printing plate is low at press start-up, or when the plate temperature increases during continued printing or in the hot summer season, excessive scumming or greasing is observed.

Furthermore, in the conventional design of printing ink for waterless lithography, it has been proposed that a material selected from the group consisting of esters, ethers, aldehydes, ketones, alcohols and mixtures thereof be added to the printing ink. However, it does not provide good printing properties for waterless lithography (see Japanese Patent Public Disclosure No. 121807/79).

SUMMARY OF THE INVENTION

It is an object of the invention, therefore, to provide an ink composition for waterless lithography that has good printing properties, particularly good transfer to a printing material, and which provides printed matter with a high gloss.

It is another object of this invention to provide a method of printing by using an ink composition for waterless lithography that has good printing properties, particularly good transfer to a printing material, and which provides printed matter with high gloss.

Other objects and advantages of the present invention may become apparent to those skilled in the art from the following description and disclosure.

DETAILED DESCRIPTION OF THE INVENTION

The invention relates to an ink composition for waterless lithography consisting essentially of about 15 to about 35 percent by weight of a vehicle resin, about 5 to about 25 percent by weight of a drying or semi-drying oil, about 15 to about 45 percent by weight of a mineral oil, and about 1 to about 40 percent by weight of a coloring material, said mineral oil comprising high-boiling petroleum solvent mixtures with a boiling point higher than 200° C. and containing less than 5 percent by volume of aromatic components.

Further, the invention relates to an ink composition for waterless lithography consisting essentially of, in addition to the above, all or a part of said drying or semi-drying oil being replaced by a member selected from the group consisting of an aliphatic acid ester, an aliphatic dibasic acid ester, a phosphoric acid ester and a mixture thereof, said member having boiling point higher than 200° C., a coagulating point less than $-5°$ C.

High-boiling petroleum solvent mixtures have generally been used in the printing ink for lithography, said solvent mixtures containing more than 5 percent by volume of an aromatic component such as, alkyl benzene, alkyl naphthalene, acenaphthene, biphenyl, fluorene, anthracene and the like. On the other hand, the high-boiling petroleum solvent mixtures to be used in the present invention contains less than 5% by volume of the aromatic components. The latter solvent, compared with the former solvent, has a high-aniline point, and causes viscosity changes when the ambient temperature is low, particularly in winter due to the high-flowing point, thereby resulting in sticking phenomena. Therefore, it has not been used conventionally as a solvent for a lithographic printing ink.

The high-boiling petroleum solvent mixtures specified in this invention has high "solvent release" with respect to the vehicle resin used in ink. When the printing ink contacts the non-image areas of the waterless lithographic printing plate, the ink film can be peeled off the non-image areas without leaving ink. In consequence, so-called scumming or greasing in the non-image areas is prevented and printed matter of good quality is obtained.

The ink composition for waterless lithography is a good composition having practical printing properties and effects. However, said ink composition has not sufficient printing properties for increasing temperature of the plate due to long-run high speed printing. And when it is at a low-temperature, particularly in winter, there are some problems: the ink becomes sticky and the material has a relatively low gloss and drying characteristics, and a skinning film is observed on the surface of ink during its storage. These defects were solved without harm in adaptability for waterless lithography by replacing all or a part of drying or semi-drying oil with a member selected from the group consisting of an aliphatic acid ester, an aliphatic dibasic acid ester, a phosphoric acid ester and a mixture thereof.

Specific examples of the high-boiling petroleum solvent mixtures that can be used in this invention are given below but it should be understood that this invention is not limited to the examples given.

| Solvent | Manufacture | contained atomatic components (vol %) | Boiling point (°C.) initial final |
|---|---|---|---|
| Absorption oil | Chevron Research Co. | 2 | 222–271 |
| 420 800 oil 5 | Texaco Inc. | 0 | 260–321 |
| Magie sol 44 | Magie Bros oil Co. | 0 | 226–260 |
| Magie sol 47 | Magie Bros oil Co. | 0 | 230–273 |
| Magie sol 52 | Magie Bros oil Co. | 0 | 265–316 |
| Deodorlized 620 oil | Magie Bros oil Co. | 0 | 288–372 |
| 1108 oil | Witco Chemical Co. | 0 | 280–324 |
| 1102 oil | Witco Chemical Co. | 0 | 266–325 |
| Mineral Seal oil | Metro oil & Chemical Co. | 3 | 260–315 |
| Mineral Seal oil | Amsco Solvents & Chemical Co. | 3 | 270–326 |
| PKWF ⅜ af | Johann Haltermann GMBH. | 2 | 210–230 |
| PKWF 4/7 S | Johann Haltermann GMBH. | 5 | 235–265 |
| PKWF 4/7 af | Johann Haltermann GMBH. | 2 | 240–270 |
| PKWF 6/9 S | Johann Haltermann GMBH. | 5 | 260–290 |
| PKWF 6/9 af | Johann Haltermann GMBH. | 2 | 260–290 |
| PKWF 28/31 | Johann Haltermann GMBH. | 2 | 280–310 |

Esters, such as, an aliphatic acid ester and an aliphatic dibasic ester, to be used in this invention must be satisfy the conditions above, otherwise they are unacceptable because of their poor printing properties and the like. Effective aliphatic acid esters and aliphatic dibasic esters are those prepared by the esterification reaction of saturated aliphatic acids having 4 to 10 carbon atoms, oleic acid and elaidic acid with saturated monohydroxy alcohols having 1 to 8 carbon atoms, said aliphatic dibasic acid ester being selected from the diesters prepared by the esterfication reaction of saturated dibasic acids having 2 to 10 carbon atoms, maleic acid and fumaric acid with saturated monohydroxy alcohols having 1 to 8 carbon atoms, and which esters include hexyl butyrate, heptyl butyrate, octyl butyrate, amyl valerate, hexyl valerate, heptyl valerate, octyl valerate, butyl caproate, amyl caproate, hexyl caproate, heptyl caproate, octyl caproate, propyl heptylate, butyl heptylate, amyl heptylate, hexyl heptylate, heptyl heptylate, octyl heptylate, ethyl caprylate, propyl caprylate, butyl caprylate, amyl caprylate, hexyl caprylate, heptyl caprylate, octyl caprylate, methyl pelargonate, ethyl pelargonate, methyl caprate, ethyl caprate, octyl caprate, ethyl oleate, propyl oleate, butyl oleate, amyl oleate, heptyl oleate, methyl elaidate, ethyl elaidate, propyl elaidate, butyl elaidate amyl elaidate, dibutyl oxalate, dibutyl malonate, diethyl succinate, dibutyl succinate, diethyl azelate, dibutyl sebacate, dioctyl sebacate, dimethyl maleate, diethyl maleate, dipropyl maleate, dibutyl maleate, diamyl maleate, dihexyl maleate, diheptyl maleate, dioctyl maleate, dimethyl fumarate, diethyl fumarate, dipropyl fumarate, dibutyl fumarate and the like.

The effective phosphoric acid ester used in this invention includes tributyl phosphate, triamyl phosphate, trihexyl phosphate, tributyl phosphate, trioctyl phosphate, tributoxyethyl phosphate, trichloroethyl phosphate and the like.

These high-boiling petroleum solvent mixtures must not contain more than 5% by volume of aromatic components; otherwise, so-called scumming or greasing is formed in the non-image areas. The amount of the high-boiling petroleum solvent mixtures to be used in the ink is determined by the other components of the ink, particularly, the vehicle resin, but for the purpose of achieving an ink composition having good waterless lithographic printing properties, 15 to 45% by weight, preferably 20% by weight of the solvent should be contained on the basis of the total amount of the ink composition.

In the case of the amount less than 1% of an aliphatic acid ester, an aliphatic dibasic acid ester or phosphoric acid ester to be used in the ink, there are some problems: so-called scumming or greasing is observed at long-run and high speed printing, the viscosity of ink changes when it is at a low-temperature, and printed materials have a relatively low gloss and low setting time. If the amount is more than 20%, the viscosity of the ink becomes low, the printing properties may be harmed and further improved effects can not be obtained. Conventional drying or semi-drying oil may be used as a combination.

The ink composition of this invention contains vehicle resins used in the conventional lithographic printing ink, such as a phenolic resin, a rosin-modified phenolic resin, alkyd resin, rosin ester resin, a petroleum resin and a maleic resin and the like. Drying or semi-drying oils may be used such as linseed oil, tung oil and safflower oil and the like. Common high-boiling petroleum solvent mixture having a boiling point between 200° and 300° C. may be used as a mineral oil, but by regulating it with the amount of the high-boiling petroleum solvent mixtures specified in this invention; aromatic components contained in the total high-boiling petroleum solvent mixtures of the ink composition must be formulated so as to be less than 5% by volume. Various conventional inorganic and organic pigments may also be used, as a coloring material. Further, well-known additives used in the conventional lithographic printing ink may be used, for example, waxes such as a paraffin wax, an amide wax, a montan wax, a carnauba wax, and the like; driers such as a metal soap of cobalt, a manganese or lead of naphthenic acid or an octanoic acid; an anti-skinning agent; anti-offset agent; and the like.

An ink varnish can be produced for example from these materials by the following method: a mixture of the resins defined above and drying or semidrying oil is heated to a temperature higher than the softening point of the resin to form a ink varnish, and to the varnish, the high-boiling petroleum solvent mixtures specified in this invention is added, together with conventional high-boiling petroleum solvent mixtures as required. For making ink for web-fed printing of a heat-set type, a high-boiling petroleum solvent mixtures having an initial boiling point lower than 260° C. is desirable used, and for sheet-fed printing and for web-fed printing of non-heat-set type, solvents having an initial boiling point higher than 260° C. are desirable.

An ink composition can be produced from the so prepared varnish by grinding and dispersing a coloring material in the varnish in a conventional manner, and adding aforementioned additives such as wax, drying, and body pigment if necessary.

This invention is described in more detail by reference to the following examples which are given here for examples only and are by no means intended to limit the scope of the invention.

SYNTHESIS 1

A mixture of 50 parts of a rosin-modified phenolic resin (Tamanol 361 of Arakawa Chemical Co. Ltd.), 10 parts of linseed oil and 40 parts each of the high-boiling petroleum solvent mixtures identified below was heated to 200° C. to form varnish for heat-set type. Seven ink varnishes were prepared this way and identified as Ink Varnishes 1 to 7.

| Absorption oil | (2% of aromatic components) | Ink Varnish 1 |
| --- | --- | --- |
| Magie Sol 44 | (0% of aromatic components) | Ink Varnish 2 |
| Magie Sol 47 | (0% of aromatic components) | Ink Varnish 3 |
| PKWF 1/3 af | (2% of aromatic components) | Ink Varnish 4 |
| PKWF 4/7 S | (5% of aromatic components) | Ink Varnish 5 |
| PKWF 4/7 af | (2% of aromatic components) | Ink Varnish 6 |
| Magie Sol 440 | (10% of aromatic components) | Ink Varnish 7 |

SYNTHESIS 2

A mixture of 45 parts of a rosin-modified phenolic resin (Tamanol 352 of Arakawa Chemical Co., Ltd.), 15 parts of linseed oil and 40 parts each of the high-boiling petroleum solvent mixtures identified below was heated to 200° C. to form varnish for sheet-fed printing. Seven ink varnishes were prepared this way and identified as Ink Varnishes 8 to 14.

| Magie sol 52 | (0% of aromatic components) | Ink Varnish 8 |
| --- | --- | --- |
| 1180 oil | (0% of aromatic components) | Ink Varnish 9 |
| Mineral seal oil | (3% of aromatic components) | Ink Varnish 10 |
| PKWF 6/9 S | (5% of aromatic components) | Ink Varnish 11 |
| PKWF 6/9 af | (2% of aromatic components) | Ink Varnish 12 |
| PKWF 28/31 | (2% of aromatic components) | Ink Varnish 13 |
| Magie sol 500 | (12% of aromatic components) | Ink Varnish 14 |

EXAMPLES 1-6

Six ink compositions were prepared from blends of 79 parts of Ink Vanishes 1 to 6, 20 parts of phtharocyanine blue, 1 part of wax by the conventional grinding and dispersion technique. The inks were identified as Ink Compositions 1 to 6.

COMPARATIVE EXAMPLE 1

Comparative Ink 1 was prepared from the same formulation as used in Example 1 except that Ink Varnish 1 as replaced by Ink Varnish 7.

COMPARATIVE EXAMPLE 2

Comparative Ink 2 was prepared from the same formulation as used in Comparative Example 1 except that 5 of the 79 parts of Ink Varnish 7 was replaced by liquid silicone (SH 510 of Toray Industries, Inc.).

PRINTING TEST 1

Heat-set printing was performed on web offset press (System 18, 4 color printer of Komori Printing Machinery Co., Ltd.) with a waterless lithographic printing plate (product of Toray Industries, Inc.) using Ink Compositions 1 to 6 and Comparative Inks 1 and 2. The printed materials were checked for so-called scumming or greasing in the non-image areas, trapping and gloss. The results are shown in the following Table 1

TABLE 1

| | Ex. | | | | | | Comp. Ex. | |
| --- | --- | --- | --- | --- | --- | --- | --- | --- |
| | 1 | 2 | 3 | 4 | 5 | 6 | 1 | 2 |
| Scumming | good | good | good | good | good | good | poor | good |
| Trapping | good | good | good | good | good | good | good | poor |
| Gloss | good | good | good | good | good | good | good | fair |

For the methods of evaluation of each factor, see below.

EXAMPLES 7-12

Six ink compositions were prepared from blends of 77 parts of Ink Varnishes 8 to 13 of Synthesis 2, 20 parts of phtharocyanine blue, 1 part of wax and 2 parts of a dryer by the conventional grinding and dispersion technique. The inks were identified as Ink Compositions 7 to 12.

COMPARATIVE EXAMPLE 3

Comparative Ink 3 was prepared from the same formulation as used in Example 7 except that Ink Varnish 8 was replaced by Ink Varnish 14.

COMPARATIVE EXAMPLE 4

Comparative Ink 4 was prepared from the same formulation as used in Comparative Example 3 except that 5 of the 77 parts of Ink Varnish 14 was replaced by liquid silicone (SH 510 of Toray Industries, Inc.).

PRINTING TEST

Sheet-fed printing was performed on a sheet-fed offset press (New Cony 4-color printing machine of Komori Printing Machinery Co., Ltd.) with a waterless lithographic printing plate (product of Toray Industries, Inc.) using Ink Compositions 8 to 13 and Comparative Inks 3 and 4. The printed materials were checked for so-called scumming or greasing in the non-image areas, trapping and gloss. The results are shown in the following Table 2.

TABLE 2

| | Ex. | | | | | | Comp. Ex. | |
| --- | --- | --- | --- | --- | --- | --- | --- | --- |
| | 7 | 8 | 9 | 10 | 11 | 12 | 3 | 4 |
| Scumming | good | good | good | good | good | good | poor | good |
| Trapping | good | good | good | good | good | good | good | poor |
| Gloss | good | good | good | good | good | good | good | fair |

Thus, the ink composition containing the high-boiling petroleum solvent mixtures specified in this invention has printing properties suitable for waterless lithographic printing to achieve the desired object with high adaptability to increasing temperature of the lithographic printing plate without increasing the coagulating force of the ink too much or without damaging the inherent characteristics of the lithographic printing ink.

SYNTHESIS 3

A mixture of 50 parts of a rosin-modified phenolic resin (Tamanol 361 of Arakawa Chemical Co., Ltd.), 10 parts of ester (a combination of two or more esters was blended in equal weights thereof) identified below and 40 parts each of the high-boiling petroleum solvent mixtures identified below was heated to 200° C. to form varnish for heat-set type. Eleven ink varnishes were prepared this way and identified as Ink Varnishes 21 to 31.

| | |
|---|---|
| Absorption oil (2% of aromatic components) Dibutyl maleate (b.p.: 220° C., m.p.: −11.2° C.) | Ink Varnish 21 |
| Magie Sol 44 (0% of aromatic components) Dibutyl sebacate (b.p.: 345° C., m.p.: −11° C.) | Ink Varnish 22 |
| Magie sol 47 (0% of aromatic components) Butyl oleate (b.p.: 228° C., m.p.: −10° C.) | Ink Varnish 23 |
| PKWF ¼ af (2% of aromatic components) Tributyl phosphate (b.p.: 289° C., m.p.: −80° C.) | Ink Varnish 24 |
| PKWF 4/7 S (5% of aromatic components) Trioctyl phosphate (b.p.: 220-250° C. (5 mmHg), m.p.: −70° C.) | Ink Varnish 25 |
| PKWF 4/7 af (2% of aromatic components) Trichloroethyl phosphate (b.p.: 210-220° C. (20 mmHg), m.p.: −20° C.) | Ink Varnish 26 |
| Magie sol 47 Dibutyl sebacate and Butyl oleate | Ink Varnish 27 |
| Magie sol 47 Dibutyl sebacate and Tributyl phosphate | INk Varnish 28 |
| Magie sol 47 Dibutyl sebacate, Butyl oleate and Tributyl phosphate | Ink Varnish 29 |
| Magie sol 440 (10% of aromatic components) Dibutyl maleate | Ink Varnish 30 |
| Magie sol 440 Tributyl phosphate | Ink Varnish 31 |

SYNTHESIS 4

A mixture of 45 parts of a rosin-modified phenolic resin (Tamanol 352 of Arakawa Chemical Co., Ltd.), 15 parts of ester (a combination of two or more esters was blended in equal weights thereof) identified below and 40 parts each of the high-boiling petroleum solvent mixtures identified below was heated to 200° C. to form varnish for sheet-fed printing. Eleven ink varnishes were prepared this way and identified as Ink Varnishes 32 to 42.

| | |
|---|---|
| Magie sol 52 (0% of aromatic components) Dibutyl fumarate (b.p.: 285° C., m.p.: −20° C.) | Ink Varnish 32 |
| 1180 oil (0% of aromatic components) Dibutyl sebacate (b.p.: 346° C., m.p.: −11° C.) | Ink Varnish 33 |
| Mineral seal oil (3% of aromatic components) Octyl caprate (b.p.: 306° C., m.p.: −15.1° C.) | Ink Varnish 34 |
| PKWF 6/9 S (5% of aromatic components) Dioctyl sebacate (b.p.: 375° C., m.p.: −55° C.) | Ink Varnish 35 |
| PKWF 6/9 af (2% of aromatic components) Tributyl phosphate (b.p.: 289° C., m.p.: −80° C.) | Ink Varnish 36 |
| PKWF 28/31 (2% of aromatic components) Trioctyl phosphate (b.p.: 220-250° C. (5 mmHg), m.p.: −70° C.) | Ink Varnish 37 |
| 1180 oil Dibutyl sebacate and Octyl caprate | Ink Varnish 38 |
| 1180 oil Dibutyl sebacate and Dioctyl sebacate | Ink Varnish 39 |
| 1180 oil Dibutyl sebacate, Octyl caprate and Dioctyl sebacate | Ink Varnish 40 |
| Magie sol 500 (12% of aromatic components) Dibutyl sebacate | Ink Varnish 41 |
| Magie sol 500 Trioctyl phosphate | Ink Varnish 42 |

EXAMPLES 13–21

Nine ink compositions were prepared from blends of 79 parts of Ink Varnishes 21 to 29, 20 parts of phtharocyanine blue, and 1 part of wax by the conventional grinding and dispersion technique. The inks were identified as Ink Compositions 13 to 21.

COMPARATIVE EXAMPLES 5–6

Comparative Inks 5–6 were prepared from the same formulation as used in Example 13 except that Ink Varnish 21 was replaced by Ink Varnishes 30 and 31.

PRINTING TEST

Heat-set printing was performed on web offset press (System 18, 4 color printer of Komori Printing Machinery Co., Ltd.) with a waterless lithographic printing plate (product of Toray Industries, Inc.) using Ink Compositions 13 to 21 and Comparative Inks 5 and 6. The printed materials were checked for so-called scumming or greasing in the non-image area, trapping, gloss, dryness and low temperature adaptability. The results are shown in the following Table 3.

TABLE 3

| | Ex. | | | | | | | | | Comp. Ex. | | Ex. |
|---|---|---|---|---|---|---|---|---|---|---|---|---|
| | 13 | 14 | 15 | 16 | 17 | 18 | 19 | 20 | 21 | 5 | 6 | 1 |
| Scumming | excel. | excel. | excel. | excel. | excel. | excel. | excel. | excel. | excel. | poor | poor | good |
| Trapping | good | good | good | good | good | good | good | good | good | good | good | good |
| Gloss | excel. | excel. | excel. | excel. | excel. | excel. | excel. | excel. | excel. | good | good | good |
| Dryness | good | good | good | good | good | good | good | good | good | good | good | fair |
| Low Temp. Adaptability | good | good | good | good | good | good | good | good | good | good | good | poor |

EXAMPLES 22–30

Nine ink compositions were prepared from blends of 77 parts of Ink Varnishes 32 to 40, 20 parts of phtharocyanine blue, 1 part of wax and 2 parts of dryer by the conventional grinding and dispersion technique. The ink were identified as Ink Compositions 22 to 30.

COMPARATIVE EXAMPLES 7–8

Comparative Inks 7–8 were prepared from the same formulation as used in Example 22 except that Ink Varnish 32 was replaced by Ink Varnishes 41 and 42.

PRINTING TEST

Sheet-fed printing was performed on a sheet-fed offset press (New Cony 4-color printing machine of Komori Printing Machinery Co., Ltd.) with a waterless lithographic printing plate (Product of Toray Industries, Inc.) using Ink Compositions 22 to 30 and Comparative Inks 7 and 8. The printed materials were checked for so-called scumming or greasing in the non-image area, trapping, gloss, dryness and low temperature adaptability. The results are shown in the following Table 4.

TABLE 4

|  | Ex. | | | | | | | | | Comp. Ex. | | Ex. |
|---|---|---|---|---|---|---|---|---|---|---|---|---|
|  | 22 | 23 | 24 | 25 | 26 | 27 | 28 | 29 | 30 | 7 | 8 | 8 |
| Scumming | excel. | excel. | excel. | excel. | excel. | excel. | excel. | excel. | excel. | poor | poor | good |
| Trapping | good | good | good | good | good | good | good | good | good | good | good | good |
| Gloss | excel. | excel. | excel. | excel. | excel. | excel. | excel. | excel. | excel. | good | fair | fair |
| Dryness | good | good | good | good | good | good | good | good | good | good | good | fair |
| Low Temp. Adaptability | good | good | good | good | good | good | good | good | good | good | good | poor |

As known from the results above, the ink compositions for waterless lithography according to the second invention also have printing properties suitable for waterless lithophoric printing, and are particularly more suitable for increasing temperature of printing plate as well as good or excellent gloss, dryness and low temperature adaptability. In case of not using high-boiling petroleum solvent mixtures specified in this invention, even if an aliphatic acid ester, an aliphatic dibasic acid ester and/or a phosphoric acid ester are used, the ink composition is not found to have sufficient printing properties for waterless lithography.

The methods of evaluation of each factor were as follows:

Scumming . . . A printed material having no so-called scumming or greasing formed in the non-image areas at a plate temperature of 50° C. or higher was evaluated as "excellent", one having no scumming formed at a temperature between 40° and 50° C. was evaluated as "good", one having no scumming formed at a temperature between 30° and 40° C. was evaluated as "fair", and one having the scumming formed 30° C. or less was evaluated as "poor".

Trapping . . . The trapping of ink in multicolor printing was checked visually and evaluated as "good" or "poor".

Gloss . . . A printed material having a gloss of 60 or more as measured with a gloss meter at an angle of reflection of 60° was evaluated as "excellent" and one having a gloss between 55 and 60 was evaluated as "good", one having a gloss between 45 and 55 was evaluated as "fair", and one having a gloss less than 45 was evaluated as "poor".

Low temperature adaptability . . . In printing at a temperature of 5° C., ink transfer to a printing material and picking off of printing paper were checked and evaluated as "good" or "poor".

Dryness . . . Setting property of ink on a printed material and offset of the printed material were checked and evaluated as "good" or "poor" on the basis of the ink compositions in Examples 1 and 8 which were evaluated to be "fair".

What is claimed is:

1. In an ink composition for waterless lithography consisting essentially of about 15 to about 35 percent by weight of a vehicle resin, said vehicle resin being selected from the group consisting of a rosin-modified phenolic resin, a phenolic resin, an alkyd resin, a rosin ester resin, a petroleum resin, a maleic resin and mixtures thereof, about 5 to about 25 percent by weight of a drying or semi-drying oil, about 15 to about 45 percent by weight of a mineral oil, and about 1 to about 40 percent by weight of a coloring material, the improvement in that said mineral oil comprises high-boiling petroleum solvent mixtures having a boiling point higher than 200° C. and contains less than 5 percent by volume of aromatic components.

2. The ink composition for waterless lithography of claim 1 in which the mineral oil having an initial boiling point lower than 260° C. is used for web-fed printing of heat-set type.

3. The ink composition for waterless lithography of claim 1 in which the mineral oil having an initial boiling point higher than 260° C. is used for sheet-fed printing.

4. The ink composition for waterless lithography of claim 1 in which the mineral oil comprises high-boiling petroleum solvent mixtures containing less than 5 percent by volume of aromatic components and conventional high-boiling petroleum solvent mixtures containing more than 5 percent by volume of aromatic components, while the amount of said aromatic components in the total high-boiling petroleum solvent mixtures is less than 5 percent by volume.

5. In an ink composition for waterless lithography consisting essentially of about 15 to about 35 percent by weight of a vehicle resin, said vehicle resin being selected from the group consisting of a rosin-modified phenolic resin, a phenolic resin, an alkyd resin, a rosin ester resin, a petroleum resin, a maleic resin and mixtures thereof, about 5 to about 25 percent by weight of a drying or semi-drying oil, about 15 to about 45 percent by weight of a mineral oil and about 1 to about 40 percent by weight of a coloring material, the improvement in that said mineral oil comprises high-boiling petroleum solvent mixtures having a boiling point higher than 200° C. and contains less than 5 percent by volume of aromatic components, and in which all or a part of said drying or semi-drying oil is replaced by a member selected from the group consisting of an aliphatic acid ester, an aliphatic dibasic acid ester, a phosphoric acid ester and mixtures thereof, said aliphatic acid ester being selected from the esters prepared by the esterification reaction of saturated aliphatic acids having 4 to 10 carbon atoms, oleic acid and elaidic acid with saturated monohydroxy alcohols having 1 to 8 carbon atoms, said aliphatic dibasic acid ester being selected from the diesters prepared by the esterification reaction of saturated dibasic acids having 2 to 10 carbon atoms, maleic acid and fumaric acid with saturated monohydroxy alcohols having 1 to 8 carbon atoms, said member having a boiling point higher than 200° C. and a coagulating point less than −5° C.

6. The ink composition for waterless lithography of claim 5 in which the mineral oil having an initial boiling point lower than 260° C. is used for web-fed printing of heat-set type.

7. The ink composition for waterless lithography of claim 5 in which the mineral oil having an initial boiling point higher than 260° C. is used for sheet-fed printing.

8. The ink composition for waterless lithography of claim 5 in which the mineral oil comprises high-boiling petroleum solvent mixtures containing less than 5 percent by volume of aromatic components and conventioal high-boiling petroleum solvent mixtures containing more than 5 percent by volume of aromatic components, while the amount of said aromatic components in the total high-boiling petroleum solvent mixture is less than 5 percent by volume.

9. The ink composition for waterless lithography of claim 5 in which all or a part of the drying or semi-drying oil is replaced by a member selected from the group consisting of an aliphatic acid ester, an aliphatic dibasic acid ester and a mixture thereof.

10. The ink composition for waterless lithography of claim 9 in which the aliphatic dibasic acid ester is a sebacic dibasic ester.

11. The ink composition for waterless lithography of claim 5 in which all or a part of the drying or semi-drying oil is replaced by a phosphoric acid ester.

12. A lithographic printing method comprising putting the following ink composition on a waterless lithographic printing plate in the absence of any kind of water fountain system to mask the non-image area, and transferring the ink to a printing material;

the ink composition for waterless lithography consisting essentially of about 15 to 35 percent by weight of a vehicle resin, said vehicle resin being selected from the group consisting of a rosin-modified phenolic resin, a phenolic resin, an alkyd resin, a rosin ester resin, a petroleum resin, a maleic resin and mixtures thereof, about 5 to about 25 percent by weight of a drying or semi-drying oil, about 15 to about 45 percent by weight of a mineral oil, and about 1 to about 40 percent by weight of a coloring material, said mineral oil comprising high-boiling petroleum solvent mixtures with a boiling point higher than 200° C. and containing less than 5 percent by volume of aromatic components.

13. A litographic printing method comprising putting the following ink composition on a waterless lithographic printing plate in the absence of any kind of water fountain system to mask the non-image area, and transferring the ink to the printing material;

the ink composition for waterless lithography consisting essentially of about 15 to about 35 percent by weight of a vehicle resin, said vehicle resin being selected from the group consisting of a rosin-modified phenolic resin, a phenolic resin, an alkyd resin, a rosin ester resin, a petroleum resin, a maleic resin and mixtures thereof, about 5 to about 25 percent by weight of a drying or semi-drying oil, about 15 to about 45 percent by weight of a mineral oil and about 1 to about 40 percent by weight of a coloring material, said mineral oil comprising high-boiling petroleum solvent mixtures with a boiling point higher than 200° C. and containing less than 5 percent by volume of aromatic components, and all or a part of said drying or semi-drying oil being replaced by a member selected from the group consisting of an aliphatic acid ester, an aliphatic dibasic acid ester, a phosphoric acid ester and a mixture thereof, said aliphatic acid ester being selected from the esters prepared by the esterification reaction of saturated aliphatic acids having 4 to 10 carbon atoms, oleic acid and elaidic acid with saturated monohydroxy alcohols having 1 to 8 carbon atoms, said aliphatic dibasic acid ester being selected from the diesters prepared by the esterification reaction of saturated dibasic acids having 2 to 10 carbon atoms, maleic acid and fumaric acid with saturated monohydroxy alcohols having 1 to 8 carbon atoms, said member having a boiling point higher than 200° C. and a coagulating point less than $-5°$ C.

* * * * *